United States Patent [19]

Sens et al.

[11] Patent Number: 5,849,361
[45] Date of Patent: Dec. 15, 1998

[54] METHINE DYES BASED ON FORMYLAMINOPYRIDONES

[75] Inventors: Rüdiger Sens, Mannheim; Andreas Johann Schmidt, Freinsheim, both of Germany; Friedrich-Wilhelm Raulfs, Higashinada Ku, Japan; Karl-Heinz Etzbach, Frankenthal, Germany

[73] Assignee: BASF Aktiengesellschaft, Ludwigshafen, Germany

[21] Appl. No.: 849,131

[22] PCT Filed: Nov. 25, 1995

[86] PCT No.: PCT/EP95/04651

§ 371 Date: Jun. 6, 1997

§ 102(e) Date: Jun. 6, 1997

[87] PCT Pub. No.: WO96/17892

PCT Pub. Date: Jun. 13, 1996

[30] Foreign Application Priority Data

Dec. 7, 1994 [DE] Germany ............... 44 43 567.3

[51] Int. Cl.⁶ ............... C07D 401/12; C07D 403/12; B41M 5/38; C09B 53/02
[52] U.S. Cl. ............... 427/395; 427/391; 544/124; 546/171; 546/277.4; 546/292
[58] Field of Search ............... 546/292, 171, 546/277.4; 427/395; 544/124

[56] References Cited

U.S. PATENT DOCUMENTS 5,132,438  7/1992  Bach et al. .
5,360,942  11/1994 Hoffman et al. .

FOREIGN PATENT DOCUMENTS 0 399 473  5/1990  European Pat. Off. .

OTHER PUBLICATIONS

J. Org. Chem., vol. 36, No. 21, 1971.

*Primary Examiner*—Alan L. Rotman
*Attorney, Agent, or Firm*—Oblon, Spivak, McClelland, Maier & Neustadt, P.C.

[57] ABSTRACT

Methine dyes of the formula

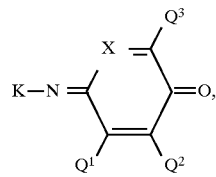

where
K is a carbocyclic or heterocyclic radical,
X is nitrogen or a radical of the formula C—$Q^1$, and
$Q^1$, $Q^2$ and $Q^3$ are hydrogen, substituted or unsubstituted $C_1$–$C_6$-alkyl, $C_3$–$C_8$-cycloalkyl, substituted or unsubstituted phenyl, $C_1$–$C_6$-alkoxy, benzyloxy, substituted or unsubstituted phenoxy, $C_1$–$C_6$-alkylthio, halogen, cyano, formylamino or a radical of the formula $R^3$, —CO—$OR^1$, —CO—$NHR^1$, —CO—NH—CO—$R^1$, —CO—NH—CO—$R^3$, —CO—NH—$SO_2R^3$, —NH—CO—$R^1$, —NH—CO—$OR^1$, —NH—CO—$NR^1R^2$, NH—CS—$OR^1$, —NH—CS—$NR^1R^2$, —NH—CO—$R^3$, —NH—$SO_2$—$R^1$, —NH—$SO_2$—$R^3$ or —NH—$SO_2$—$NR^1R^2$, wherein $R^1$ and $R^2$ are substituted or unsubstituted $C_1$–$C_{13}$-alkyl, $C_3$–$C_8$-cycloalkyl or substituted or unsubstituted phenyl, or else —$NR^1R^2$ is amino, and $R^3$ is a heterocyclic radical, or $Q^1$ and $Q^2$ are together with the carbon atoms to which they are attached a carbocyclic or heterocyclic ring,
with the proviso that at least one of $Q^1$, $Q^2$ or $Q^3$ is formylamino, are useful in thermal transfer.

7 Claims, No Drawings

METHINE DYES BASED ON FORMYLAMINOPYRIDONES

CROSS-REFERENCE

This application is a 371 of PCT/EP95/04651 filed Nov. 25, 1995.

BACKGROUND OF THE INVENTION

Field of the Invention

The present invention relates to novel methine dyes of the formula I

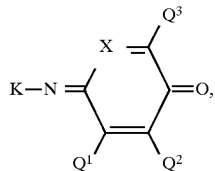

(I)

where
K is a 5- or 6-membered carbocyclic or heterocyclic radical,
X is nitrogen or a radical of the formula C—$Q^1$, and
$Q^1$, $Q^2$ and $Q^3$ are independently of one another hydrogen, $C_1$–$C_6$-alkyl with or without interruption by 1 or 2 oxygen atoms in ether function, benzyl, $C_3$–$C_8$-cycloalkyl, substituted or unsubstituted phenyl, $C_1$–$C_4$-fluoroalkyl, $C_1$–$C_6$-alkoxy, benzyloxy, substituted or unsubstituted phenoxy, $C_1$–$C_6$-alkylthio, halogen, cyano, formylamino or a radical of the formula $R^3$, —CO—$OR^1$, —CO—$NHR^1$, —CO—NH—CO—$R^1$, —CO—NH—CO—$R^3$, —CO—NH—$SO_2$—$R^3$, —NH—CO—$R^1$, —NH—CO—$OR^1$, —NH—CO—$NR^1R^2$, NH—CS—$OR^1$, —NH—CS—$NR^1R^2$, —NH—CO—$R^3$, —NH—$SO_2$—$R^1$, —NH—$SO_2$—$R^3$ or —NH—$SO_2$—$NR^1R^2$, wherein $R^1$ and $R^2$ are independently of each other $C_1$–$C_{13}$-alkyl with or without substitution and with or without interruption by from 1 to 3 oxygen atoms in ether function, $C_3$–$C_8$-cycloalkyl or substituted or unsubstituted phenyl, or else —$NR^1R^2$ is amino, and $R^3$ is a 5- or 6-membered aromatic heterocyclic radical with or without benzofusion and with one or more hetero atoms selected from the group consisting of nitrogen, oxygen and sulfur, or $Q^1$ and $Q^2$ are together with the carbon atoms to which they are attached a 5- or 6-membered carbocyclic or heterocyclic ring,
with the proviso that at least one of $Q^1$, $Q^2$ or $Q^3$ is formylamino, and to a process for their thermal transfer.

DESCRIPTION OF THE BACKGROUND

U.S. Pat. No. 5,310,942 discloses the thermal transfer of pyridone dyes. However, it has been found that the dyes used there still have application defects.

SUMMARY OF THE INVENTION

It is an object of the present invention to provide novel methine dyes which are advantageously useful for non-impact printing processes, for example for thermal transfer, and in this use show in particular high thermal stability, high light fastness, high color strength and high brilliance. The novel dyes should also be advantageous for dyeing or printing textile materials.

We have found that this object is achieved by the above-defined methine dyes of the formula I.

DETAILED DESCRIPTION OF THE INVENTION

K is a 5- or 6-membered carbocyclic or heterocyclic, preferably aromatic, radical which may be substituted and may be benzofused.

K can be derived for example from components of the benzene, indole, quinoline, naphthalene, pyrrole, thiazole, benzimidazole, benzothiazole, thiophene or pyridine series.

Important radicals K are for example those of the formulae IIa to IIj

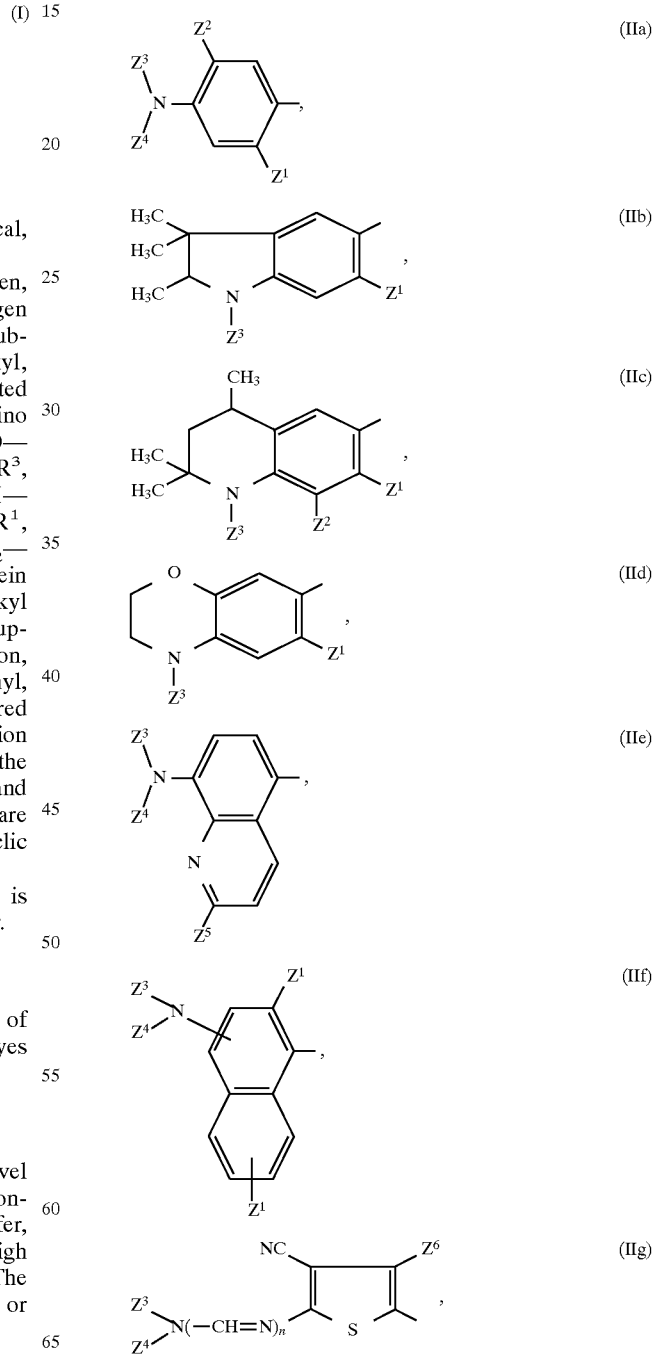

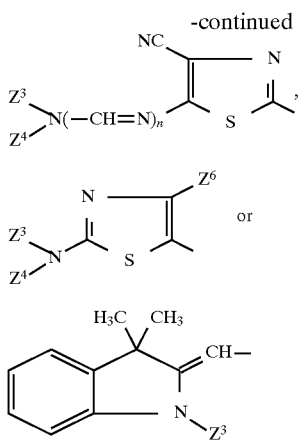

(IIh), (IIi), (IIj)

where
n is 0 or 1,

Z$^1$ is hydrogen, C$_1$–C$_6$-alkyl with or without interruption by 1 or 2 oxygen atoms in ether function, hydroxyl, C$_1$–C$_6$-alkoxy, C$_1$–C$_6$-alkylsulfonylamino, mono- or di(C$_1$—C$_6$-alkyl)aminosulfonylamino or the radical —NHCOZ$^7$ or —NHCO$_2$Z$^7$, wherein Z$^7$ is phenyl, benzyl, tolyl or C$_1$–C$_6$-alkyl with or without interruption by an oxygen atom in ether function, Z$^2$ is hydrogen, halogen, C$_1$–C$_6$-alkyl or C$_1$–C$_6$-alkoxy, Z$^3$ and Z$^4$ are independently of each other hydrogen, C$_1$–C$_{13}$-alkyl with or without substitution and with or without interruption by from 1 to 3 oxygen atoms in ether function, C$_3$–C$_4$-alkenyl, C$_3$–C$_8$-cycloalkyl, phenyl or tolyl or are together with the nitrogen atom joining them together a 5- or 6-membered saturated heterocyclic radical with or without further hetero atoms, Z$^5$ is hydrogen or C$_1$–C$_6$-alkyl, and Z$^6$ is hydrogen, halogen, C$_1$–C$_6$-alkyl, substituted or, unsubstituted phenyl, substituted or unsubstituted benzyl, C$_3$–C$_8$-cycloalkyl, thienyl, hydroxyl, C$_1$–C$_6$-alkoxy, C$_1$–C$_6$-alkylthio or C$_1$–C$_6$-monoalkylamino.

Any alkyl or alkenyl appearing in the abovementioned formulae may be straight-chain or branched.

Any substituted alkyl appearing in the abovementioned formulae may have as substituents for example, unless otherwise stated, cyclohexyl, substituted or unsubstituted phenyl, C$_1$–C$_8$-alkanoyloxy, C$_1$–C$_8$-alkylaminocarbonyloxy, C$_1$–C$_8$-alkoxycarbonyl, C$_1$–C$_8$-alkoxycarbonyloxy, the alkyl chain of the last three being optionally interrupted by from 1 to 3 oxygen atoms in ether function and being optionally phenyl- or phenoxy-substsituted, cyclohexyloxy, phenoxy, halogen, hydroxyl, carboxyl or cyano. The number of substituents in substituted alkyl is generally 1 or 2.

Any oxygen-interrupted alkyl appearing in the abovementioned formulae is preferably interrupted by 1 or 2 oxygen atoms in ether function.

Any substituted phenyl appearing in the abovementioned formulae may have as substituents for example C$_1$–C$_8$-alkyl, C$_1$–C$_8$-alkoxy, halogen, in particular chlorine or bromine, nitro or carboxyl. The number of substituents in substituted phenyl is generally from 1 to 3.

Q$^1$, Q$^2$, Q$^3$, R$^1$, R$^2$, Z$^1$, Z$^2$, Z$^3$, Z$^4$, Z$^5$, Z$^6$ and Z$^7$ are each for example methyl, ethyl, propyl, isopropyl, butyl, isobutyl, sec-butyl, tert-butyl, pentyl, isopentyl, neopentyl, tert-pentyl, hexyl or 2-methylpentyl.

R$^1$, R$^2$, Z$^3$ and Z$^4$ may each also be for example heptyl, octyl, 2-ethylhexyl, isooctyl, nonyl, isononyl, decyl, isodecyl, undecyl, dodecyl, tridecyl, isotridecyl [the designations isooctyl, isononyl, isodecyl and isotridecyl are trivial names derived from the oxo process alcohols (cf. Ullmann's Encyclopedia of Industrial Chemistry, 5th Edition, Vol. A1, pages 290 to 293, and also Vol. A 10, pages 284 and 285)].

Q$^1$, Q$^2$, Q$^3$, R$^1$, R$^2$, Z$^1$, Z$^3$, Z$^4$, and Z$^7$ may each also be for example 2-methoxyethyl, 2-ethoxyethyl, 2-propoxyethyl, 2-butoxyethyl, 2- or 3-methoxypropyl, 2- or 3-ethoxypropyl, 2- or 3-propoxypropyl, 2- or 4-methoxybutyl or 2- or 4-ethoxybutyl, 3,6-dioxaheptyl, 3,6-dioxaoctyl, 3,7-dioxaoctyl or 4,7-dioxaoctyl.

R$^1$, R$^2$, Z$^3$ and Z$^4$ may each also be for example 2- or 3-butoxypropyl, 2- or 4-butoxybutyl, 4,8-dioxanonyl, 3,7-dioxanonyl, 4,7-dioxanonyl, 4,8-dioxadecyl, 3,6,9-trioxadecyl or 3,6,9-trioxaundecyl.

Q$^1$, Q$^2$, Q$^3$, Z$^1$, Z$^2$ and Z$^6$ may each also be for example methoxy, ethoxy, propoxy, isopropoxy, butoxy, isobutoxy, sec-butoxy, pentyl, isopentyloxy, neopentyloxy or hexyloxy.

Q$^1$, Q$^2$, Q$^3$, R$^1$, R$^2$ and Z$^6$ may each also be for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-chlorophenyl, 2,6-dichlorophenyl, 2-, 3- or 4-nitrophenyl or 2-, 3- or 4-carboxylphenyl.

Q$^1$, Q$^2$, Q$^3$, Z$^3$, Z$^4$ and Z$^6$ may each also be for example cyclopropyl, cyclobutyl, cyclopentyl, cyclohexyl, cycloheptyl or cyclooctyl.

R$^1$, R$^2$, Z$^3$ and Z$^4$ may each also be for example cyclohexylmethyl, 1- or 2-cyclohexylethyl, carboxylmethyl, 2-carboxylethyl, 2- or 3-carboxylpropyl, trifluoromethyl, 2-chloroethyl, 2-cyclohexyloxyethyl, phenoxymethyl, 2-phenoxyethyl, 2- or 3-phenoxypropyl, benzyl, 2-methylbenzyl, 1- or 2-phenylethyl, 2-hydroxyethyl, 2- or 3-hydroxypropyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl, 2-ethoxycarbonylethyl, 2- or 3-ethoxycarbonylpropyl, 2-methoxycarbonyloxyethyl, 2- or 3-methoxycarbonyloxypropyl, 2-ethoxycarbonyloxyethyl, 2- or 3-ethoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl, 2- or 3-(2-ethoxyethoxycarbonyloxy)propyl, 2-methylaminocarbonyloxyethyl or 2-ethylaminocarbonyloxyethyl.

Q$^1$, Q$^2$, Q$^3$, Z$^2$ and Z$^6$ may each also be for example fluorine, chlorine or bromine.

Q$^1$, Q$^2$, Q$^3$ and Z$^6$ may each also be for example fluoromethyl, difluoromethyl, trifluoromethyl, 1,1,1-trifluoroethyl, pentylfluoroethyl, bis(trifluoromethyl)methyl, heptafluoropropyl, methylthio, ethylthio, propylthio, isopropylthio, butylthio, isobutylthio, sec-butylthio, pentylthio, isopentylthio, neopentylthio, tert-pentylthio or hexylthio.

Q$^1$, Q$^2$ and Q$^3$ may each also be for example phenoxy, 2-, 3- or 4-methylphenoxy, 2-, 3- or 4-methoxyphenoxy or 2-, 3- or 4-chlorophenoxy.

Z$^1$ may also be for example methylsulfonylamino, ethylsulfonylamino, propylsulfonylamino, isopropylsulfonylamino, butylsulfonylamino, pentylsulfonylamino, hexylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino, mono- or dipentylaminosulfonylamino, mono- or dihexylaminosulfonylamino or (N-methyl-N-ethylaminosulfonyl)amino.

$Z^6$ may also be for example benzyl, 2-methylbenzyl, 2,4-dimethylbenzyl, 2-methoxybenzyl, 2,4-dimethoxybenzyl, methylamino, ethylamino, propylamino, isopropylamino, butylamino, pentylamino or hexylamino.

$Z^3$ and $Z^4$ may each also be for example allyl or methallyl.

$Z^3$ and $Z^4$ combined with the nitrogen atom joining them together into a 5- or 6-membered saturated heterocyclic radical with or without further hetero atoms can be for example pyrrolidinyl, piperidinyl, morpholinyl, piperazinyl or N—($C_1$–$C_4$-alkyl)piperazinyl.

$Q^1$ and $Q^2$ combined with the nitrogen atom joining them together into a 5- or 6-membered carbocyclic or heterocyclic ring can be for example a pyrrole, benzene or pyridine ring. These rings may also be substituted and/or saturated. $R^3$ is derived from a 5- or 6-membered aromatic heterocyclic radical which may be benzofused and which has one or more hetero atoms selected from the group consisting of nitrogen, oxygen and sulfur.

Suitable heterocyclic species, substituted or unsubstituted, from which $R^3$ is derived include for example pyrrole, furan, thiophene, pyrazole, imidazole, oxazole, thiazole, isothiazole, 1,2,4-triazole, 1,2,4-oxadiazole, 1,3,4-oxadiazole, 1,2,4-thiadiazole, 1,3,4-thiadiazole, pyridine, pyridazine, pyrimidine or pyrazine.

Attention may be drawn in particular to heterocycles of the pyrrole, thiophene, isoxazole, pyridine or pyridazine series.

Suitable $R^3$—Co or $R^3$—$SO_2$ radicals include in particular those 5- or 6-membered aromatic heterocyclic radicals which are derived from the following heterocyclic carboxylic acids $R^3$—COOH or sulfonic acids $R^3$—$SO_3H$:

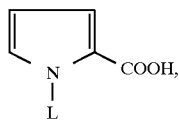
(IIIa)

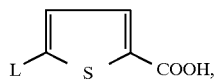
(IIIb)

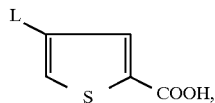
(IIIc)

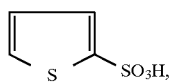
(IIId)

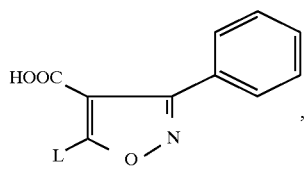
(IIIe)

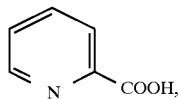
(IIIf)

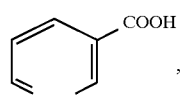
(IIIg)

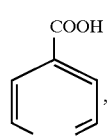
(IIIh)

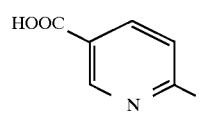
(IIIi)

or

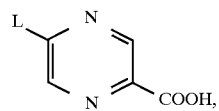
(IIIj)

where L is $C_1$–$C_4$-alkyl in each case.

Suitable $R^3$ radicals include in particular the radicals of the formulae IIIa to IIIj in which the carboxyl or sulfonic acid radicals have been replaced by a single bond.

Preference is given to methine dyes of the formula I where $Q^1$, $Q^2$ and $Q^3$ are independently of one another hydrogen, halogen, $C_1$–$C_4$-alkyl, $C_1$–$C_4$-alkoxy, formylamino or a radical of the formula —NH—CO—$R^1$ or —NH—CO—$OR^1$, where $R^1$ is in each case as defined above.

Preference is further given to methine dyes of the formula I where K is a radical of the formula IIa, IIc or IIi, especially the radical of the formula IIa.

Preference is further given to methine dyes of the formula I where at least one of $Q^2$ or $Q^3$ is formylamino and $Q^1$ is not formylamino.

Particular preference is given to methine dyes of the formula I where $Q^1$ is hydrogen, $C_1$–$C_4$-alkyl, halogen or a radical of the formula —NH—CO—$R^1$ where $R^1$ is $C_1$–$C_6$-alkyl which may be phenyl-, halogen- or hydroxyl-substituted or cyclohexyl, and $Q^2$ and $Q^3$ are independently of each other hydrogen, $C_1$–$C_4$-alkyl, formylamino or a radical of the formula —NH—CO—$R^1$ where $R^1$ is $C_1$–$C_6$-alkyl or tolyl.

Very particular preference is given to methine dyes of the formula Ia

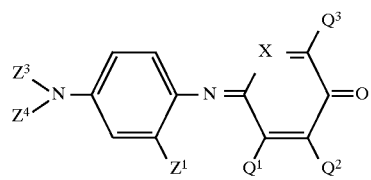
(Ia)

where

X is nitrogen or a radical of the formula C—$Q^1$, nitrogen being particularly preferred, $Z^1$ is hydrogen, $C_1$–$C_4$-alkyl or $C_2$–$C_5$-alkanoylamino, $Z^3$ and $Z^4$ are independently of each other $C_1$–$C_6$-alkyl which may be hydroxyl-substituted, benzyl, cyclohexyl, phenyl or tolyl, $Q^1$ is hydrogen, $C_1$–$C_4$-alkyl, $C_1$–$C_4$-alkoxy or a radical of the formula —NH—CO—$R^1$, and $Q^2$ and $Q^3$ are independently of each other hydrogen, $C_1$–$C_4$-alkyl, $C_1$–$C_4$-alkoxy, formylamino or a radical of the formula —NH—CO—$R^1$ or —NH—CO—$OR^1$ where $R^1$ is in each case $C_1$–$C_6$-alkyl which may be hydroxyl-substituted, benzyl, cyclohexyl, phenyl or tolyl, with the proviso that at least one of $Q^2$ or $Q^3$ is formylamino.

Of particular interest are methine dyes of the formula Ia where
$Z^1$ is hydrogen, methyl, ethyl or $C_2$–$C_5$-alkanoylamino,
$Z^3$ and $Z^4$ are independently of each other $C_1$–$C_6$-alkyl or benzyl,
$Q^1$ is hydrogen, $C_1$–$C_4$-alkyl or $C_2$–$C_5$-alkanoylamino, and
$Q^2$ and $Q^3$ are independently of each other hydrogen, $C_1$–$C_4$-alkyl, $C_1$–$C_5$-alkanoylamino, benzoylamino or methylbenzoylamino.

The methine dyes of the formula I can be obtained for example by the methods mentioned in U.S. Pat. No. 5,310,942.

For example, a nitroso compound of the formula IV

  (IV), where K is as defined above, can be condensed with a hydroxyaromatic of the formula V

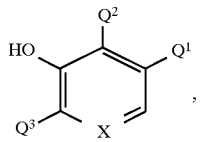  (V)

where $Q^1$, $Q^2$, $Q^3$ and X are each as defined above.

It is also possible to couple amines of the formula VI

  (VI), where K is in each case as defined above, oxidatively with the hydroxyaromatics of the formula V.

The present invention further provides a process for transferring dyes from a transfer to plastic-coated paper by diffusion or sublimation with the aid of an energy source, which comprises using a transfer on which there is or are one or more methine dyes of the formula I.

To make the transfers required for the process of the present invention, the methine dyes of the formula I are incorporated in a suitable organic solvent or a mixture of solvents with one or more binders with or without auxiliaries to form a printing ink. This printing ink preferably contains the dyes in a molecularly disperse, ie. dissolved, form. The printing ink can be applied to the inert support by means of a doctor blade and air dried. Suitable organic solvents for the dyes include for example those in which the solubility of the dyes at a temperature of 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene or mixtures thereof.

Suitable binders include all resins or polymer materials which are soluble in organic solvents and which are capable of binding the dyes to the inert support sufficiently firmly as to prevent rubbing off. Preference is given to those binders which, after the air drying of the printing ink, include the dyes in the form of a clear, transparent film without any visible crystallization of the dyes.

Such binders are mentioned for example in U.S. Pat. No. 5,132,438 or in the pertinent patent applications cited therein. Also suitable are saturated linear polyesters.

Preferred binders include ethylcellulose, ethylhydroxyethylcellulose, polyvinyl butyral, polyvinyl acetate, cellulose propionate or saturated linear polyesters.

The weight ratio of binder: dye generally ranges from 1:1 to 10:1.

Suitable auxiliaries include for example release agents as mentioned in U.S. Pat. No. 5,132,438 or the pertinent patent applications cited therein. Also suitable are especially organic additives which prevent the crystallizing out of the transfer dyes in the course of storage or on heating of the color ribbon, for example cholesterol or vanillin.

Suitable inert supports are described for example in U.S. Pat. No. 5,132,438 or in the pertinent patent applications cited therein. The thickness of the support generally ranges from 3 to 30 μm, preferably from 5 to 10 μm.

Suitable dye receiver layers include in principle all thermally stable plastics layers with affinity for the dyes to be transferred, for example modified polycarbonates or polyesters. Further details can be found for example in U.S. Pat. No. 5,132,438 or the pertinent patent applications cited therein.

The process of transfer is effected by means of an energy source, for example by means of a laser or a thermal head, for which the latter has to be heatable to a temperature of ≧300° C. so that the transfer of the dye can take place within the time range t: 0<t <15 msec. The dye migrates out of the transfer sheet and diffuses into the surface coating of the receiving medium.

The methine dyes of the formula I used in the process of the present invention are notable for advantageous application properties. They exhibit high solubility in the color ribbon (good compatibility with the binder), a high stability in the printing ink, good transferability, high image stability (ie. good lightfastness and also good stability to environmental effects, for example moisture, temperature or chemicals), and permit flexible coloristic adaptation to given subtractive primary colors as part of an optimal trichromat. They are also notable for high brilliance owing to the high transparency in the blue and green parts of the spectrum.

The dyes of the formula I according to the present invention are also advantageously useful for dyeing synthetic materials, for example polyesters, polyamides or polycarbonates. Particularly suitable are materials in textile form, such as fibers, yarns, threads, knits, wovens or non-wovens composed of polyester or polyamide or else polyester-cotton blend fabrics. The methine dyes of the formula I are also suitable for dyeing keratinous fibers, for example hairs or furs.

The novel dyes of the formula I are also advantageously useful for manufacturing color filters as described for example in EP-A-399 473.

Finally, they can also be used with advantage as colorants in electrophotographic toners.

The Examples which follow illustrate the invention.

A) Preparation

Example 1

5.35 g (0.025 mol) of 4-diethylamino-2-methylaniline hydrochloride and 3.45 g (0.025 mol) of 2-formylamino-3-hydroxypyridine (prepared as described in J. Org. Chem., 36 (1971), 3238–40) were dissolved in 70 ml of methanol. To this solution were added 50 ml of water and 7.95 g (0.075 mol) of sodium carbonate dissolved in 50 ml of water. Then 6.8 g (0.03 mol) of ammonium peroxodisulfate dissolved in 50 ml of water were added dropwise at a temperature maintained within the range from 15° C. to 20° C. The batch was subsequently stirred for 30 min and filtered with suction, and the filter residue was washed with water and dried at room temperature to leave, in a 36% yield, the dye of the formula

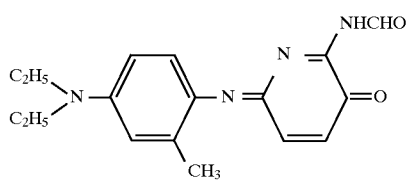

The dye was recrystallized from isopropanol.
mp.: 140° C.
$\lambda_{max}$: 633 nm (tetrahydrofuran)
ε:

$$65400 \frac{1}{mol \cdot cm}$$

(chloroform)

Example 2

5.15 g (0.025 mol) of 4-diethylamino-2-acetylaminoaniline were dissolved in 50 ml of water and 20 ml of concentrated hydrochloric acid. 10 ml of 23% strength by weight aqueous sodium nitrite solution were added dropwise at from 0° to 50°°C. and the mixture was subsequently stirred at from 0° to 5° C. for 2 h. The resulting nitroso compound was admixed with 100 ml of ethyl acetate and adjusted with 25% strength by weight aqueous ammonia solution to pH 8 at from 0° to 10° C. The organic phase was separated off, concentrated and redissolved in methanol. This methanolic solution of the nitroso compound was admixed with Raney nickel and reduced with hydrogen. On completion of the reduction the catalyst was filtered off and the solution was concentrated. The concentrate was added to 3.45 g (0.025 mol) of 2-formylamino-3-hydroxypyridine and both components were dissolved with 70 ml of methanol. This was followed by dilution with 50 ml of water, the addition of 5.3 g (0.05 mol) of sodium carbonate dissolved in 50 ml of water and dropwise addition at from 10° to 20° C. of 6.8 g (0.03 mol) of ammonium peroxodisulfate dissolved in 50 ml of water. The mixture was subsequently stirred for 30 min and filtered with suction, and the filter residue was washed with 1:1 v/v methanol/water and then with water and dried to leave, in a 47% yield, the dye of the formula

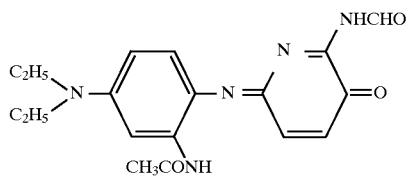

mp.: 189° C.
max: 644 nm (tetrahydrofuran)

Example 3

8.2 g (0.025 mol) of 4-dibutylamino-2-acetylaminoaniline (79.4% strength by weight) were nitrosated and reduced as described in Example 2. 3.45 g (0.025 mol) of 2-formylamino-3-hydroxypyridine were dissolved in 70 ml of methanol together with the above-reduced compound. 5.3 g (0.05 mol) of sodium carbonate in solid form were sprinkled in, and then 6.8 g (0.03 mol) of ammonium peroxodisulfate dissolved in 50 ml of water were slowly added dropwise at about 10° C. The batch was subsequently stirred for 30 min and filtered with suction, and the filter residue was washed with water and dried at room temperature to leave, in a 15% yield, the dye of the formula

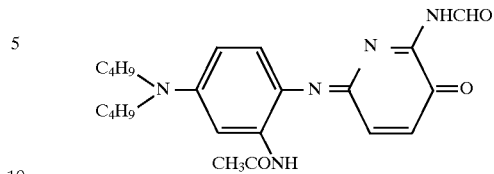

mp.: 155° C.
$\lambda_{max}$: 648 nm (tetrahydrofuran)
ε: 1/mol·cm (chloroform)

The same method was used to obtain the dyes of Tables 1 and 2 below. In addition to the absorption maximum (measured in tetrahydrofuran) the tables also contain the $R_f$ value on silica gel and the volume ratio of the toluene (T)/ethyl acetate (E) used as mobile phase in the chromatography.

TABLE 1

| Ex. No. | K | $\lambda_{max}$ [nm] | $R_f$ value | T/E |
|---|---|---|---|---|
| 4 | $C_2H_5$, $(CH_3)_2CH$ N—〈ring〉—CH_3 | 638 | 0.49 | 3:2 |
| 5 | $C_2H_5$, $C_3H_7$ N—〈ring〉—CH_3 | 636 | 0.43 | 3:2 |
| 6 | $(C_2H_5OC_2H_4)_2N$—〈ring〉—CH_3CO—NH | 640 | 0.31 | 0:1 |
| 7 | $(C_3H_7)_2N$—〈ring〉—$(CH_3)_3CCO$—NH | 652 | 0.43 | 3:2 |
| 8 | $(C_2H_5)_2N$—〈ring〉—$(CH_3)_2CHCO$—NH | 646 | 0.27 | 3:2 |
| 9 | $C_2H_5$, $(CH_3)_2CHC_2H_4$ N—〈ring〉—CH_3 | 637 | 0.50 | 3:2 |

TABLE 1-continued

![structure: K—N=... with NHCHO, N, =O on pyridone ring]

| Ex. No. | K | λ_max [nm] | R_f value | T/E |
|---|---|---|---|---|
| 10 | (C4H9)2N—C6H3(—NH—COCH2OCH3)— | 645 | 0.22 | 3:2 |
| 11 | CH3OOCC2H4—N(C2H5)—C6H4— | 607 | 0.50 | 0:1 |
| 12 | CH3OC2H4—N(C2H5)—C6H3(CH3)— | 628 | 0.26 | 3:2 |
| 13 | 2,2,4,6-tetramethyl-1-(C2H4COOCH3)-1,2,3,4-tetrahydroquinolin-7-yl | 626 | 0.28 | 3:2 |
| 14 | (C2H5)2N—C6H3(CH3)(—NH—COCOOCH3)— | 640 | 0.17 | 3:2 |
| 15 | C4H9(C4H9OC2H4)N—C6H4— | 653 | 0.43 | 3:2 |
| 16 | [(CH3)2CH]2N—C(=N—)—S—C(CH3)=C(C6H5)— | 629 | | |
| 17 | 1,2,2,4,6,7-hexamethyl-1,2,3,4-tetrahydroquinolin-8-yl | | 0.39 | 3:2 |
| 18 | C4H9((CH3)2CHCH2)N—C6H4— | 622 | 0.45 | 3:2 |
| 19 | (CH3COC2H4)2N—C6H4— | 609 | 0.23 | 3:2 |
| 20 | C2H5(HOC2H4)N—C6H3(CH3)— | 620 | 0.40 | 3:2 |
| 21 | C2H9((CH3)2CHCH2)N—C6H4— | 620 | 0.35 | 3:2 |
| 22 | C4H9(C6H13)N—C6H4— | 622 | 0.35 | 3:2 |
| 23 | (C2H5)2N—C6H3(CH3)(—NH—CO—(2-thienyl))— | 634 | 0.25 | 3:2 |
| 24 | 8-(C4H9(C2H5)CHCH2NH)-2-methylquinolin-5-yl | 650 | 0.35 | 3:2 |
| 25 | (C2H5)2N—C6H3(CH3)(—NH—SO2—(2-thienyl))— | 631 | 0.32 | 3:2 |

TABLE 2

Structure:
$$\text{K－N}=\overset{\overset{\displaystyle \text{NHCHO}}{|}}{\underset{\underset{\displaystyle \text{CH}_3}{|}}{\bigcirc}}=\text{O}$$

| Ex. No. | K | $\lambda_{max}$ [nm] | $R_f$ value | T/E |
|---|---|---|---|---|
| 26 | (C$_2$H$_5$)$_2$N—C$_6$H$_3$(CH$_3$)—NH—COCH$_3$ | 628 | 0.20 | 3:2 |
| 27 | (C$_2$H$_5$)$_2$N—C$_6$H$_3$—NH—SO$_2$—(2-thienyl) | 614 | 0.33 | 3:2 |
| 28 | (C$_3$H$_7$)$_2$N—C$_6$H$_3$(CH$_3$)—NH—COC(CH$_3$)$_3$ | 640 | 0.40 | 3:2 |
| 29 | (C$_2$H$_5$)$_2$N—C$_6$H$_3$(CH$_3$)—NH—COCH(CH$_3$)$_2$ | 631 | 0.27 | 3:2 |
| 30 | (C$_2$H$_5$)(HOC$_2$H$_4$)N—C$_6$H$_3$(CH$_3$)—CH$_3$ | 626 | 0.31 | 3:2 |
| 31 | (CH$_3$COOC$_2$H$_4$)(C$_2$H$_5$)N—C$_6$H$_4$—CH$_3$ | 598 | 0.26 | 3:2 |
| 32 | 1,2,2,4,6-pentamethyl-1-(2-methoxycarbonylethyl)-1,2,3,4-tetrahydroquinolin-7-yl | 614 | 0.37 | 3:2 |
| 33 | ((CH$_3$)$_2$CH)(C$_2$H$_5$)N—C$_6$H$_3$(CH$_3$)—CH$_3$ | 626 | 0.29 | 3:2 |
| 34 | (C$_4$H$_9$)(C$_4$H$_9$OC$_2$H$_4$)N—C$_6$H$_4$—CH$_3$ | 607 | 0.46 | 3:2 |
| 35 | (C$_2$H$_5$)((CH$_3$)$_2$CHC$_2$H$_4$)N—C$_6$H$_3$(CH$_3$)—CH$_3$ | 627 | 0.46 | 3:2 |
| 36 | (C$_4$H$_9$)$_2$N—C$_6$H$_3$(OCH$_3$)—OCH$_3$ | 642 | 0.52 | 0:1 |

The below-mentioned dyes likewise have advantageous properties.

| Ex. No. | | Hue |
|---|---|---|
| 37 | 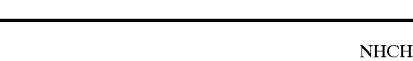 | cyan |

-continued
| Ex. No. | | Hue |
|---|---|---|
| 38 | 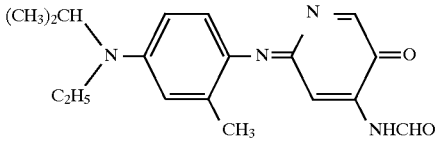 | cyan |
| 39 | 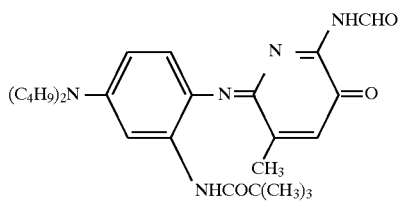 | cyan |
| 40 | 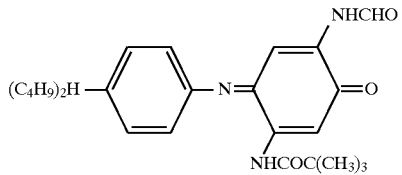 | blue |
| 41 | 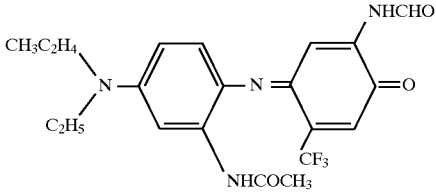 | cyan |
| 42 | 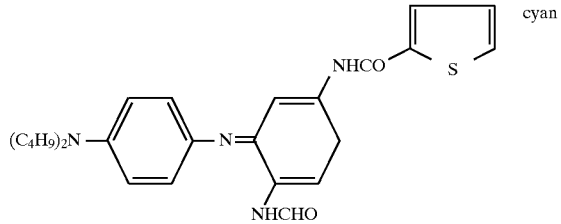 | cyan |
| 43 | 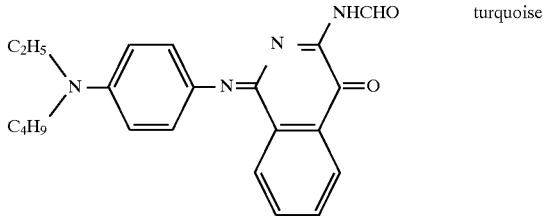 | turquoise |
| 44 | 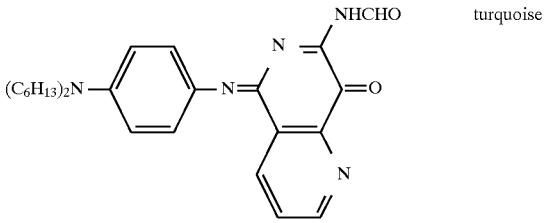 | turquoise |

-continued

| Ex. No. | | Hue |
|---|---|---|
| 45 | (structure) | cyan |
| 46 | (structure) | cyan |
| 47 | (structure) | cyan |
| 48 | (structure) | blue |
| 49 | (structure) | cyan |
| 50 | (structure) | cyan |
| 51 | (structure) | cyan |

-continued

| Ex. No. | | Hue |
|---|---|---|
| 52 | 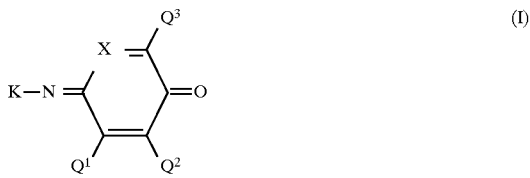 | cyan |
| 53 | 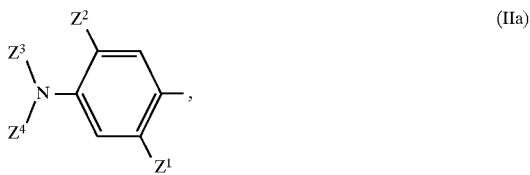 | blue |

B) Application in Thermal Transfer

General method:

a) 10 g of dye are stirred, if necessary with brief heating to 80°–90° C., into 100 g of a 10% strength by weight solution of a binder in 4.5:2:2 v/v/v methyl ethyl ketone/toluene/cyclohexanone.

The mixture is applied with a 6 μm doctor blade to a 6 μm thick polyester film which has a suitable subbing layer on the back and is blown dry with a hair dryer in the course of 1 minute. Before the color ribbon can be printed, it has to be air dried for at least a further 24 hours, since residual solvents can impair the printing process.

b) The color ribbons are printed on an experimental computer-controlled apparatus equipped with a commercial thermal printing head onto commercial videoprint paper.

The voltage is altered to control the energy emitted by the thermal printing head, the length of a pulse having been set to 7 ms and only one pulse being emitted at a time. The emitted energy level ranges from 0.5 to 2.0 mJ/dot.

Since the depth of the color is directly proportional to the supplied energy, it is possible to produce a color wedge for spectroscopic evaluation.

The depth of the color is plotted against the supplied energy per heating element to determine the Q* value (=energy in mJ for the absorbance value of 1) and the gradient m in 1/mJ.

The results obtained are listed in the Table below. Unless other-wise stated, the binder used was based on saturated linear polyester and the receiving medium used was color videoprint paper from Hitachi.

TABLE 3

| Dye No. | Q* [mJ/dot] | m [l/mJ] |
|---|---|---|
| 1 | 0.74 | 4.4 |
|   | 0.75[a] | 4.4[a] |
|   | 1.08[b] | 3.9[b] |
| 2 | 0.93 | 2.9 |
|   | 0.85[a] | 2.9[a] |
|   | 1.29[b] | 2.3[b] |

TABLE 3-continued

| Dye No. | Q* [mJ/dot] | m [l/mJ] |
|---|---|---|
| 4 | 0.77 | 4.1 |
| 5 | 0.76 | 3.9 |
| 6 | 0.90 | 2.9 |
| 7 | 0.92 | 3.0 |
| 10 | 0.90 | 3.2 |
| 19 | 1.02 | 4.0 |

[a]Binder: polyvinyl butyral
[b]Binder: cellulose propionate
Receiving medium: color videoprint paper (SV 100) from Kodak

We claim:

1. Methine dyes of the formula I $$\begin{array}{c} Q^3 \\ X \\ K-N \\ Q^1 \quad Q^2 \end{array} \quad (I)$$

where

K is a radical of the formula

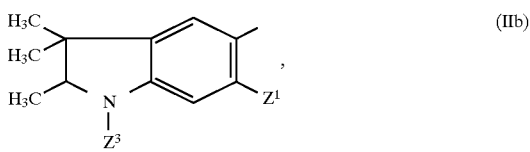

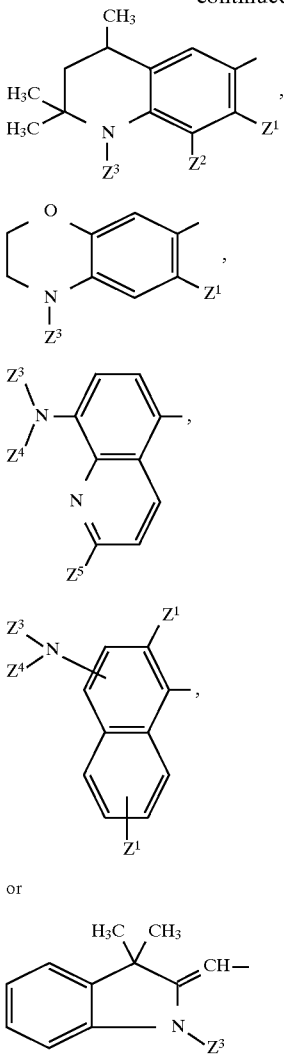

where n is 0 or 1, $Z^1$ is hydrogen, $C_1$–$C_6$-alkyl with or without interruption by 1 or 2 oxygen atoms in ether function, hydroxyl, $C_1$–$C_6$-alkoxy, $C_1$–$C_6$-alkylsulfonylamino, mono- or di($C_1$–$C_6$-alkyl)aminosulfonylamino or the radical —NHCO$Z^7$ or —NHCO$_2Z^7$, wherein $Z^7$ is phenyl, benzyl, tolyl or $C_1$–$C_6$-alkyl with or without interruption by an oxygen atom in ether function, $Z^2$ is hydrogen, halogen, $C_1$–$C_6$-alkyl or $C_1$–$C_6$-alkoxy, $Z^3$ and $Z^4$ are independently of each other hydrogen, $C_1$–$C_3$-alkyl with or without substitution and with or without interruption by from 1 to 3 oxygen atoms in ether function, $C_3$–$C_4$-alkenyl , $C_3$–$C_8$-cycloalkyl, phenyl or tolyl or are together with the nitrogen atom joining them together at 5- or 6-membered saturated heterocyclic radical without further hetero atoms, $Z^5$ is hydrogen or $C_1$–$C_6$-alkyl, and $Z^6$ is hydrogen, halogen, $C_1$–$C_6$-alkyl, substituted or unsubstituted phenyl, substituted or unsubstituted benzyl, $C_3$–$C_8$-cycloalkyl, thienyl, hydroxyl, $C_1$–$C_6$-alkoxy, $C_1$–$C_6$-alkylthio or $C_1$–$C_6$-monoalkylamino, X is nitrogen, and $Q^1$, $Q^2$ and $Q^3$ are independently of one another hydrogen, $C_1$–$C_6$-alkyl with or without interruption by 1 or 2 oxygen atoms in ether function, benzyl, $C_3$–$C_8$-cycloalkyl, substituted or unsubstituted phenyl, $C_1$–$C_4$-fluoroalkyl, $C_1$–$C_6$-alkoxy, benzyloxy, substituted or unsubstituted phenoxy, $C_1$–$C_6$-alkylthio, halogen, cyano, formylamino or a radical of the formula $R^3$, —CO—$OR^1$, —CO—$NHR^1$, —CO—NH—CO—$R^1$, —CO—NH—CO—$R^3$, —CO—NH—SO$_2$—$R^3$, —NH—CO—$R^1$, —NH—CO—$OR^1$, —NH—CO—$NR^1R^2$, NH—CS—$OR^1$, —NH— CS—$NR^1R^2$, —NH—CO—$R^3$, —NH—SO$_2$—$R^1$, —NH—SO$_2$—$R^3$ or —NH—SO$_2$—$NR^1R^2$, wherein $R^1$ and $R^2$ are independently of each other $C_1$–$C_{13}$-alkyl with or without substitution and with or without interruption by from 1 to 3 oxygen atoms in ether function, $C_3$–$C_8$-cycloalkyl or substituted or unsubstituted phenyl, or else —$NR^1R^2$ is amino, and $R^3$ is a 5- or 6-membered aromatic heterocyclic radical with or without benzofusion and with one or more hetero atoms selected from the group consisting of nitrogen, oxygen and sulfur, with the proviso that at least one of $Q^1$, $Q^2$ or $Q^3$ is formylamino.

2. Methine dyes as claimed in claim 1 wherein $Q^1$, $Q^2$ and $Q^3$ are independently of one another hydrogen, halogen, $C_1$–$C_4$-alkyl, $C_1$–$C_4$-alkoxy, formylamino or a radical of the formula —NH—CO—$R^1$ or —NH—CO—$OR^1$, where $R^1$ is in each case as defined in claim 1.

3. Methine dyes as claimed in claim 1, wherein K is a radical of the formula IIa or IIc.

4. Methine dyes as claimed in claim 1, wherein $Q^1$ is hydrogen, $C_1$–$C_4$-alkyl, halogen or a radical of the formula —NH—CO—$R^1$ where $R^1$ is $C_1$–$C_6$-alkyl which are optionally phenyl-, halogen- or hydroxyl-substituted or cyclohexyl, and $Q^2$ and $Q^3$ are independently of each other hydrogen, $C_1$–$C_4$-alkyl, formylamino or a radical of the formula —NH—CO—$R^1$ where $R^1$ is $C_1$–$C_6$-alkyl or tolyl.

5. Methine dyes as claimed in claim 1 conforming to the formula Ia

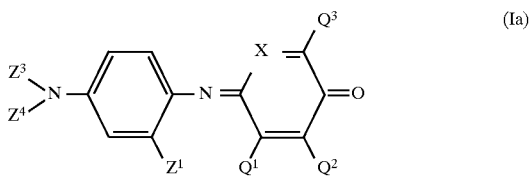

where

X is nitrogen or a radical of the formula C—$Q^1$, $Z^1$ is hydrogen, $C_1$–$C_4$-alkyl or $C_2$–$C_5$-alkanoylamino, $Z^3$ and $Z^4$ are independently of each other $C_1$–$C_6$-alkyl which are optionally hydroxyl-substituted, benzyl, cyclohexyl, phenyl or tolyl, $Q^1$ is hydrogen, $C_1$–$C_4$-alkyl, $C_1$–$C_4$-alkoxy or a radical of the formula —NH—CO—$R^1$, and $Q^2$ and $Q^3$ are independently of each other hydrogen, $C_1$–$C_4$-alkyl, $C_1$–$C_4$-alkoxy, formylamino or a radical of the formula —NH—CO—$R^1$ or —NH—CO—$OR^1$ where $R^1$ is in each case $C_1$–$C_6$-alkyl which may be hydroxyl-substituted, benzyl, cyclohexyl, phenyl or tolyl, with the proviso that at least one of $Q^2$ or $Q^3$ is formylamino.

6. The methine dye as claimed in claim 1, having the formula

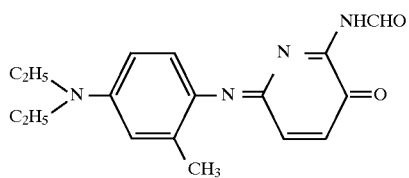
7. A process for transferring dyes from a transfer to plastic-coated paper by diffusion or sublimation with the aid of an energy source, which comprises using a transfer on which there is or are one or more methine dyes as claimed in claim 1.
* * * * *